(12) United States Patent
Tsai et al.

(10) Patent No.: US 11,953,078 B1
(45) Date of Patent: Apr. 9, 2024

(54) LOW SPEED GEAR MODULE

(71) Applicant: SHA YANG YE INDUSTRIAL CO., LTD., Taoyuan (TW)

(72) Inventors: Feng-Chun Tsai, Taoyuan (TW); Ming-Han Tsai, Taoyuan (TW); Chin-Fa Lu, Taoyuan (TW); Kai-Hsien Wang, Taoyuan (TW)

(73) Assignee: SHA YANG YE INDUSTRIAL CO., LTD., Taoyuan (TW)

( * ) Notice: Subject to any disclaimer, the term of this patent is extended or adjusted under 35 U.S.C. 154(b) by 0 days.

(21) Appl. No.: 18/234,864

(22) Filed: Aug. 16, 2023

(51) Int. Cl.
| | |
|---|---|
| *F16H 1/46* | (2006.01) |
| *F02C 7/06* | (2006.01) |
| *F16H 48/42* | (2012.01) |
| *F16H 57/021* | (2012.01) |
| *F16H 57/08* | (2006.01) |

(52) U.S. Cl.
CPC ............. *F16H 1/46* (2013.01); *F16H 57/082* (2013.01); *F02C 7/06* (2013.01); *F16H 48/42* (2013.01); *F16H 2048/423* (2013.01); *F16H 2048/426* (2013.01); *F16H 57/021* (2013.01); *F16H 2057/085* (2013.01)

(58) Field of Classification Search
CPC ........ F16H 1/46; F16H 1/57; F16H 2057/085; F16H 2048/423; F16H 2048/426; F16H 48/42; F16H 57/021; B25B 21/008; F02C 7/06
See application file for complete search history.

(56) References Cited

U.S. PATENT DOCUMENTS

| | | | | |
|---|---|---|---|---|
| 1,499,763 A | * | 7/1924 | Davis ........................ | F16H 1/46 475/341 |
| 3,780,601 A | * | 12/1973 | Dach ..................... | F16H 57/082 475/331 |
| 4,043,226 A | * | 8/1977 | Buuck ..................... | F16D 11/14 192/89.21 |
| 4,280,376 A | * | 7/1981 | Rosen ..................... | F16H 55/08 74/462 |
| 5,242,336 A | * | 9/1993 | Hori ......................... | F16H 1/46 475/338 |

(Continued)

FOREIGN PATENT DOCUMENTS

CN 207921241 U * 9/2018 ............... F16H 1/46

*Primary Examiner* — Tinh Dang
(74) *Attorney, Agent, or Firm* — Chun-Ming Shih; HDLS IPR SERVICES

(57) ABSTRACT

A gear module includes a rotating cylinder, a first planetary gear set, a second planetary gear set, a concave-convex structure, and a limit bearing set. The first planetary gear set is accommodated in the rotating cylinder and includes a driven gear; the second planetary gear set includes a positioning frame, second planetary gears pivoted to a positioning frame, a driven gear engaged with the second planetary gears, and the positioning frame has a through hole; the concave-convex structure includes a convex column extended from the rotating cylinder and a concave hole formed on the positioning frame, the convex column is plugged into the concave hole; the limit bearing set includes a first ball bearing sheathing the driven gear and mounted between the driven gear and the through hole, and a second ball bearing sheathing the convex column and mounted between the convex column and the concave hole.

10 Claims, 13 Drawing Sheets

(56) References Cited

U.S. PATENT DOCUMENTS

| | | | | |
|---|---|---|---|---|
| 5,328,419 A | * | 7/1994 | Motl | F16H 3/56 |
| | | | | 475/338 |
| 5,385,514 A | * | 1/1995 | Dawe | F16H 13/06 |
| | | | | 475/341 |
| 5,910,066 A | * | 6/1999 | Schulz | F16H 1/2863 |
| | | | | 475/331 |
| 6,033,336 A | * | 3/2000 | Bae | F16H 1/46 |
| | | | | 475/341 |
| 9,574,637 B2 | * | 2/2017 | Hansson | F16H 1/28 |
| 2019/0383360 A1 | * | 12/2019 | Schulz | F16H 57/082 |
| 2022/0186826 A1 | * | 6/2022 | Terada | F16H 57/031 |

* cited by examiner

LOW SPEED GEAR MODULE

BACKGROUND OF THE DISCLOSURE

Technical Field

The technical field relates to a gear structure, and more particularly relates to a low speed gear module.

Description of Related Art

A related-art planetary gear module mainly includes an inner gear and a plurality of planetary gears. A sun gear is installed at the output position of a motor for outputting the power of the motor and plugged into the center of the inner gear. Each planetary gear is clamped between the sun gear and the inner gear, and has one side engaged with the sun gear and another side engaged with the inner gear, such that the output power of the motor is adjusted by the planetary gear and then transmitted to the inner gear.

However, the planetary gear module lacks the functions of braking, reducing the rotation speed and providing high torque. If the inner gear is used to drive a heavy object up or down, the gravity of the heavy object itself may exert force on the inner gear. Although the sun gear does not rotate, the planetary gear still rotates by engaging, so the inner gear may be driven by the heavy object to rotate, thereby causing that after the heavy object reaches a preset position, the heavy object is pulled by gravity to move downward at a high speed, or causing the heavy object to fall at a high speed when transporting the heavy object from top to bottom.

In view of the aforementioned problems, the inventor of this disclosure has been studying the related art with the application of theories to overcome the problems of the related art.

SUMMARY OF THE DISCLOSURE

This disclosure provides a low speed gear module, which uses a first ball bearing mounted between a driven gear and a through hole, and uses a second ball bearing mounted between a convex column and a concave hole, to greatly improve the torque of the low speed gear module.

In an embodiment of this disclosure, the low speed gear module includes: a fixed cylinder part, having a first inner gear; a rotating cylinder, arranged corresponding to the fixed cylinder part and rotatable relative to the fixed cylinder part, and having a second inner gear, and the interior of the first inner gear and the interior of the second inner gear jointly forming an accommodating space; a first planetary gear set, accommodated in the accommodating space, and including a fixing plate, a plurality of first planetary gears fixedly connected to one side of the fixing plate and a driven gear fixedly connected to another side of the fixing plate; a sun gear, installed between the plurality of first planetary gears, each first planetary gear having one side engaged with the sun gear and another side engaged with the first inner gear, so as to drive the driven gear to rotate with the plurality of first planetary gears; a second planetary gear set, installed at the periphery of the driven gear, and including a positioning frame and a plurality of second planetary gears pivotally connected to a side of the positioning frame, each second planetary gear having one side engaged with the driven gear and another side engaged with the first inner gear and the second inner gear, so as to drive the rotating cylinder to rotate with the driven gear, a side of the positioning frame being provided with a through hole for passing the driven gear; a concave-convex structure, including a convex column extended from the rotating cylinder or another side of the positioning frame and a concave hole formed on another one of the rotating cylinder and another side of the positioning frame, the convex column inserted in the concave hole; and a limit bearing set, including a first ball bearing sheathing the driven gear and mounted between the driven gear and the through hole, and a second ball bearing sheathing the convex column and mounted between the convex column and the concave hole.

Based on the above, the first ball bearing is mounted between the driven gear and the through hole to decrease the gap between the driven gear and the through hole, thereby reducing the offset space of the driven gear, and reducing the shaking of the driven gear to be securely engaged with the plurality of second planetary gears. The second ball bearing is mounted between the convex column and the concave hole to decrease the gap between the convex column and the concave hole, thereby reducing the offset space of the plurality of second planetary gears, and reducing the shaking of the plurality of second planetary gears to be securely engaged with the second inner gear. Therefore, the torque of the low speed gear module is greatly improved.

DETAILED DESCRIPTION

Figure 1:
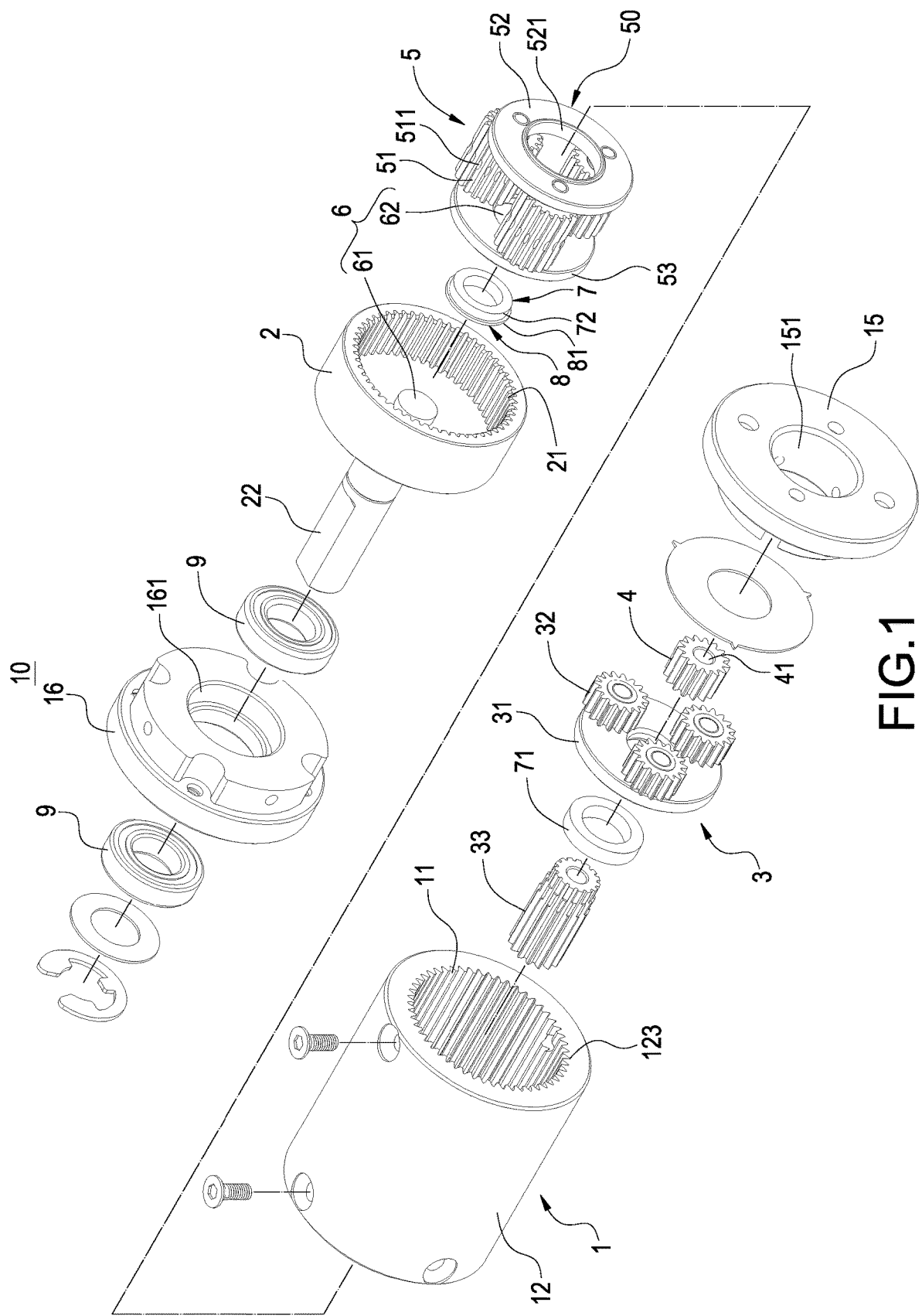
FIG. 1 is an exploded view of a low speed gear module of this disclosure.
Figure 2:
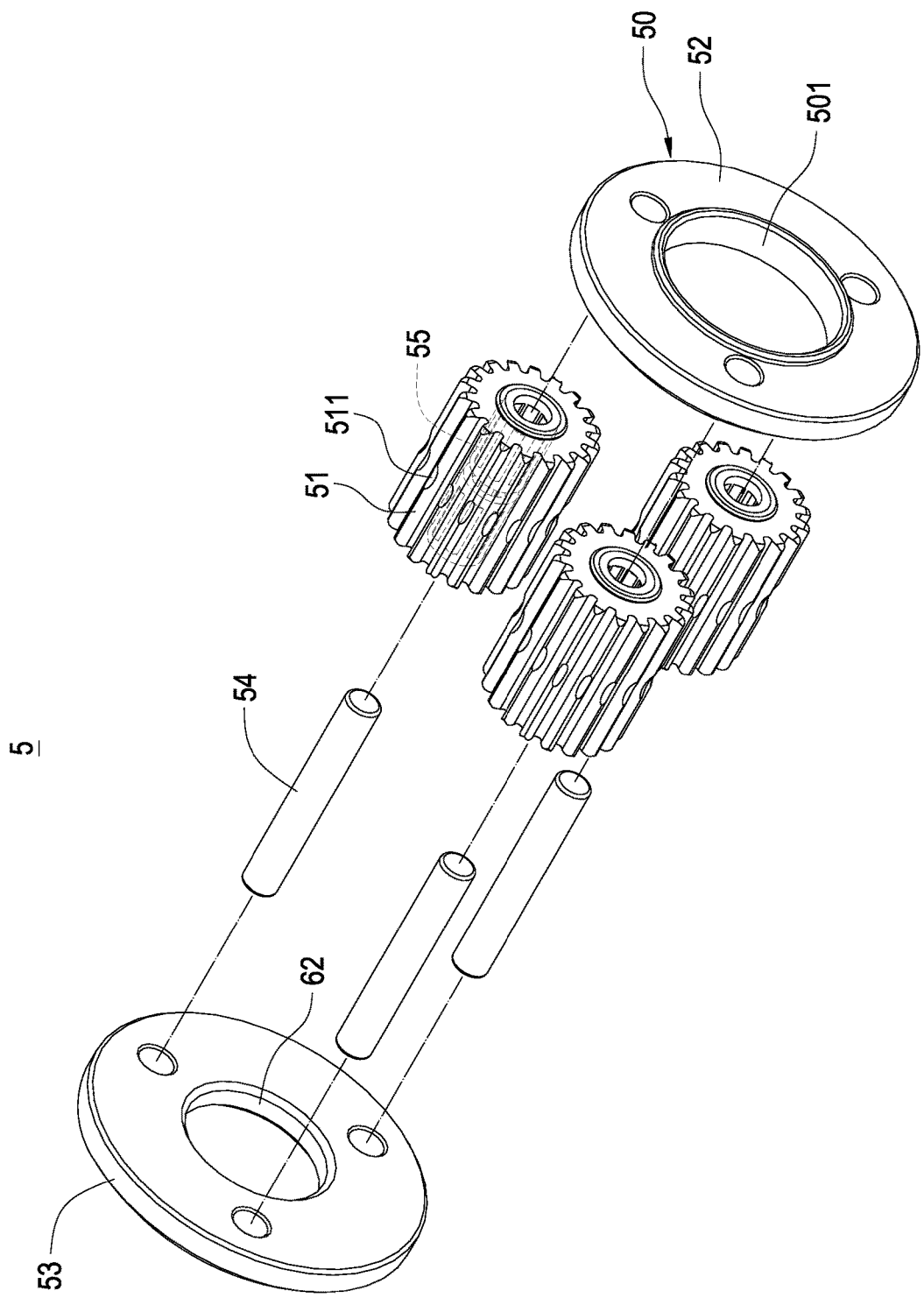
FIG. 2 is an exploded view of a second planetary gear set of this disclosure.
Figure 3:
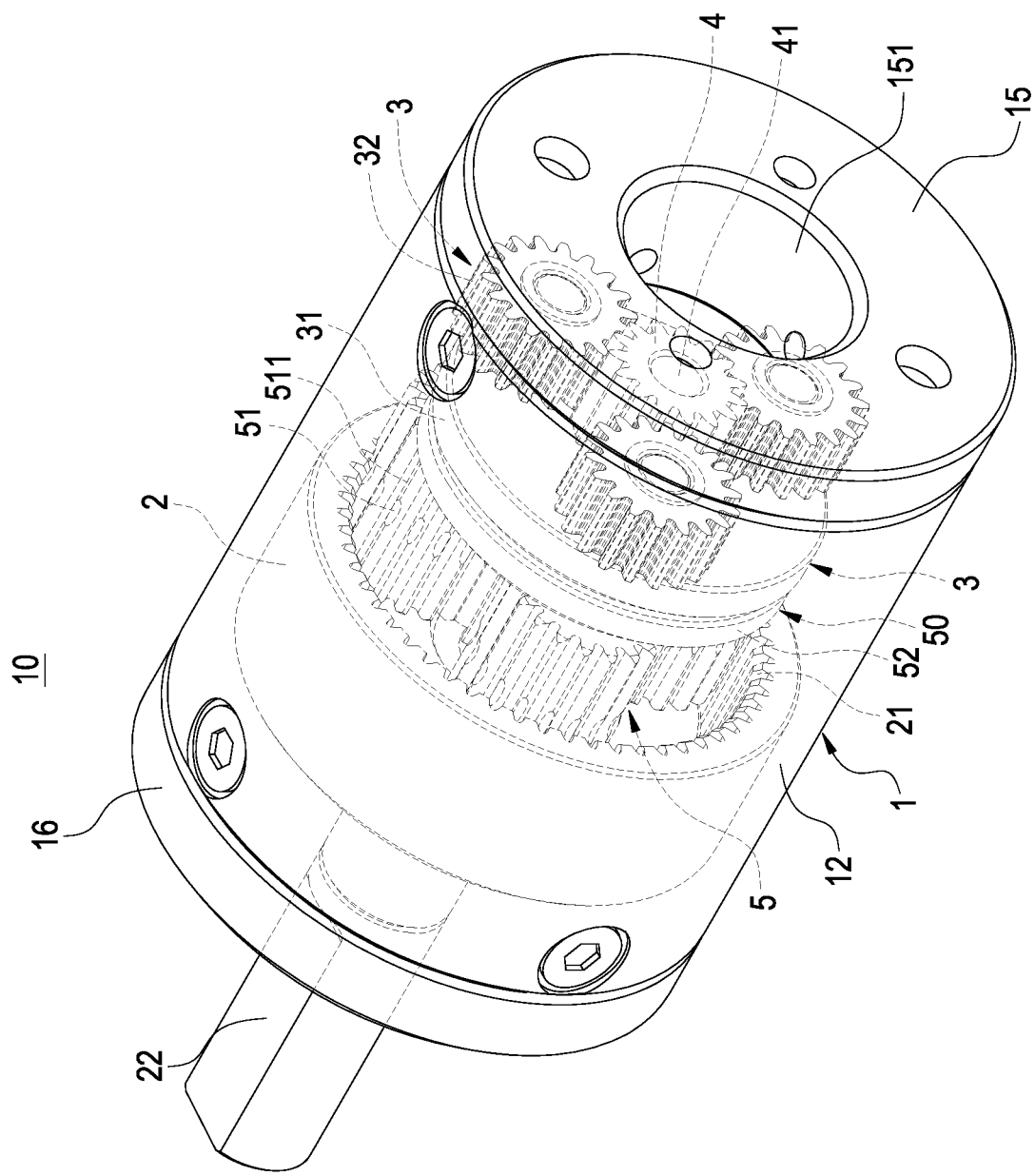
FIG. 3 is a perspective view of a low speed gear module of this disclosure.
Figure 4:
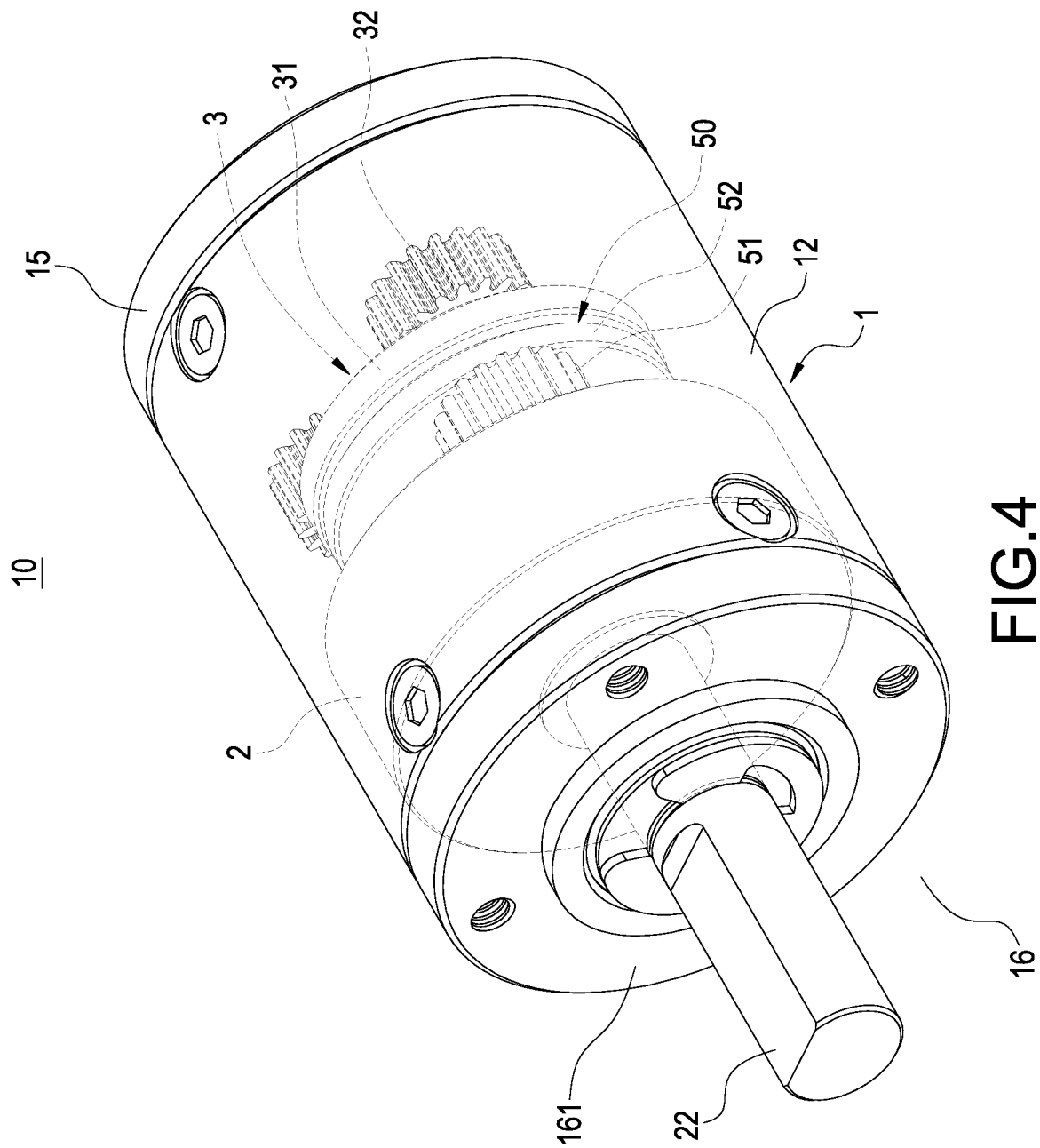
FIG. 4 is another perspective view of a low speed gear module of this disclosure.

The technical contents of this disclosure will become apparent with the detailed description of embodiments accompanied with the illustration of related drawings as follows. It is intended that the embodiments and drawings disclosed herein are to be considered illustrative rather than restrictive.

With reference to FIGS. 1 to 10 for a low speed gear module of this disclosure, the low speed gear module 10 includes a fixed cylinder part 1, a rotating cylinder 2, a first planetary gear set 3, a sun gear 4, a second planetary gear set 5, a concave-convex structure 6 and a limit bearing set 7.

In FIGS. 1, and 3 to 10, the fixed cylinder part 1 includes a first inner gear 11 which is described in details below. The fixed cylinder part 1 includes an outer cylinder body 12, a first cover plate 15 and a second cover plate 16. Two ends of the outer cylinder body 12 have two openings 123, the first cover plate 15 and the second cover plate 16 cover the two openings 123 respectively. The first inner gear 11 is formed at an inner periphery of one side of the outer cylinder body 12, and a ring groove 121 is formed at an inner periphery of another side of the outer cylinder body 12.

In FIGS. 1, and 3 to 8, the rotating cylinder 2 is rotatably embedded in the ring groove 121, i.e., the rotating cylinder 2 is arranged corresponding to the fixed cylinder part 1 and rotatable relative to the fixed cylinder part 1. The rotating cylinder 2 includes a second inner gear 21 extended with a rotating shaft 22, and formed at the inner periphery of the rotating cylinder 2, the interior of the first inner gear 11 and the interior of the second inner gear 21 jointly form an accommodating space s, and the second cover plate 16 includes a second hollow port 161, and the rotating shaft 22 is inserted into the second hollow port 161 and exposed from the second hollow port 161.

In FIGS. 1, 3 to 5, and 7 to 10, the first planetary gear set 3 is accommodated in the accommodating space s, the first planetary gear set 3 includes a fixing plate 31, a plurality of first planetary gears 32 fixedly connected to one side of the fixing plate 31 and a driven gear 33 fixedly connected to another side of the fixing plate 31, and the plurality of first planetary gears 32 are equidistantly arranged in a circular shape and fixedly connected to the fixing plate 31.

In FIGS. 1, 3, 5, 7 and 10, the sun gear 4 is installed between the plurality of first planetary gears 32, each first planetary gear 32 has one side engaged with the sun gear 4 and another side engaged with the first inner gear 11, so as to drive the driven gear 33 to rotate with the plurality of first planetary gears 32. The first cover plate 15 has a first hollow port 151, the sun gear 4 has a plug hole 41, and the first hollow port 151 and the plug hole 41 are arranged opposite to each other.

In FIGS. 1 to 5 and 7 to 9, the second planetary gear set 5 is installed at the periphery of the driven gear 33, the second planetary gear set 5 includes a positioning frame 50 and a plurality of second planetary gears 51 pivotally connected to the positioning frame 50, each second planetary gear 51 has one side engaged with the driven gear 33 and another side engaged with the first inner gear 11 and the second inner gear 21, so as to drive the rotating cylinder 2 to rotate with the driven gear 33, and a side of the positioning frame 50 is provided with a through hole 501 for passing the driven gear 33.

Further, the positioning frame 50 includes a first clamping plate 52 and a second clamping plate 53. The plurality of second planetary gears 51 are arranged equidistantly in a circular shape, clamped between the first clamping plate 52 and the second clamping plate 53, and pivotally connected to the first clamping plate 52 and the second clamping plate 53. A through hole 501 is formed on the first clamping plate 52.

In addition, the positioning frame 50 further includes a plurality of pivot rods 54 with two ends fixedly connected between the first clamping plate 52 and the second clamping plate 53, each second planetary gear 51 is pivotally connected to each pivot rod 54, the second planetary gear set 5 further includes a plurality of needle roller bearings 55, and each needle roller bearing 55 sheathes each pivot rod 54 and disposed between each pivot rod 54 and each second planetary gear 51, such that each second planetary gear 51 rotates more smoothly through the needle roller bearing 55.

In addition, each second planetary gear 51 has a circular notch 511 formed along its outer periphery and between the first inner gear 11 and the second inner gear 21. Since the second inner gear 21 rotates relative to the first inner gear 11, the circular notch 511 of the second planetary gear 51 provides a slight offset space for the second inner gear 21, so that the circular notch 511 allows a tolerance between the first inner gear 11, the second inner gear 21 and the second planetary gear 51, thereby allowing the second planetary gear 51 to rotate stably even if there is a slight size discrepancy.

In FIGS. 1, 2, 5 and 7, the concave-convex structure 6 includes a convex column 61 extended from the rotating cylinder 2 or another side of the positioning frame 50, and a concave hole 62 formed on another one of the rotating cylinder 2 and another side of the positioning frame 50. The convex column 61 is inserted into the concave hole 62, and the positioning frame 50 is limited at the position of the rotating cylinder 2 by the concave-convex structure 6.

In this embodiment, the convex column 61 is extended from an inner side of the rotating cylinder 2, a rotating shaft 22 is extended from an outer side of the rotating cylinder 2, the convex column 61 is installed to the bottom end of the rotating shaft 22, the concave hole 62 is formed on the second clamping plate 53, here is not intended to be limiting, the concave hole 62 may also be formed on an inner side of the rotating cylinder 2, and the convex column 61 may also be extended from second clamping plate 53.

In FIGS. 1, 5, and 7 to 9, the limit bearing set 7 includes a first ball bearing 71 sheathing the driven gear 33 and mounted between the driven gear 33 and the through hole 501, and a second ball bearing 72 sheathing the convex column 61 and mounted between the convex column 61 and the concave hole 62.

In detail, the first ball bearing 71 is mounted between the driven gear 33 and the first clamping plate 52, and the second ball bearing 72 is mounted between the convex column 61 and the second clamping plate 53.

Figure 5:
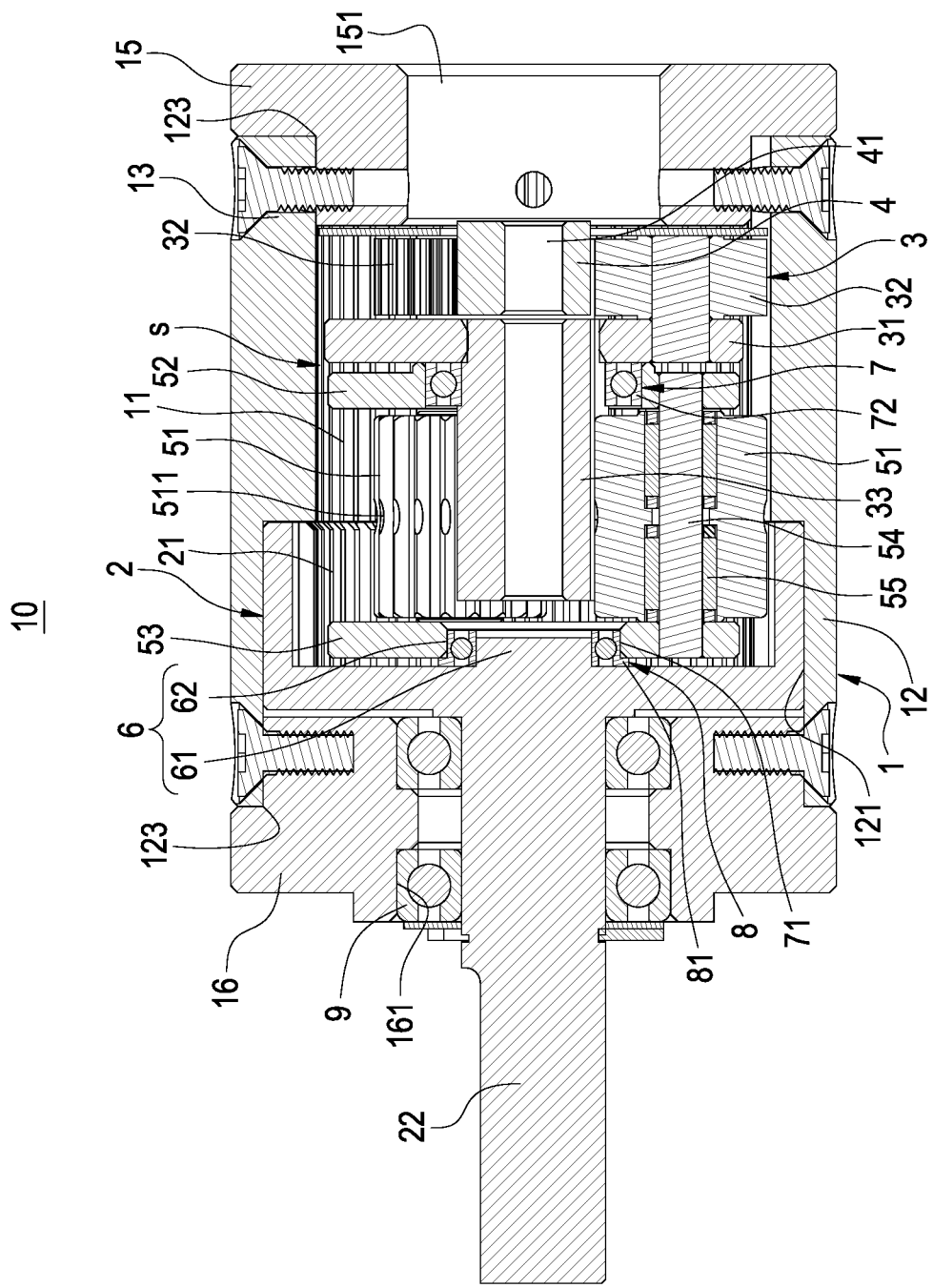
FIG. 5 is a cross-sectional view of a low speed gear module of this disclosure.
Figure 6:
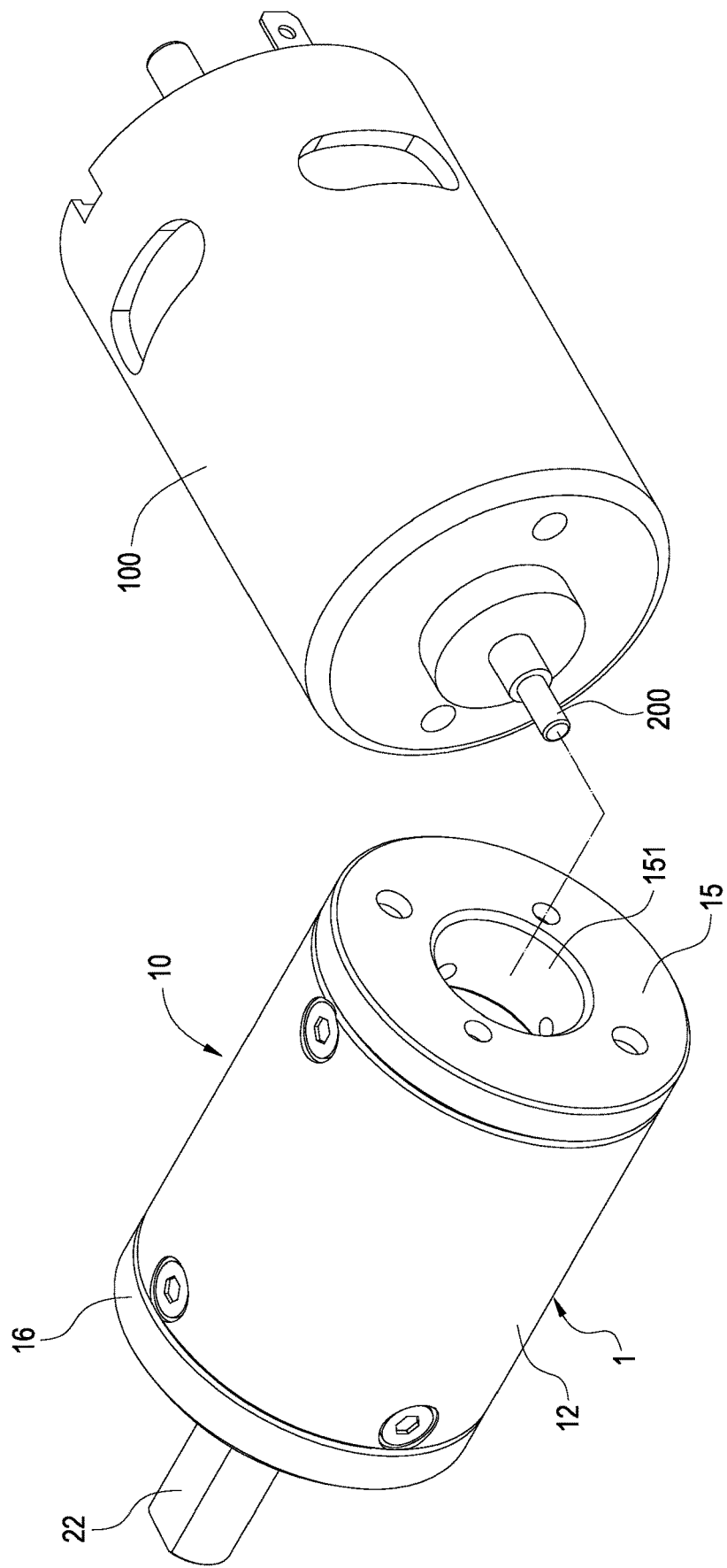
FIG. 6 is a 3D view showing a using status of a low speed gear module of this disclosure.
Figure 7:
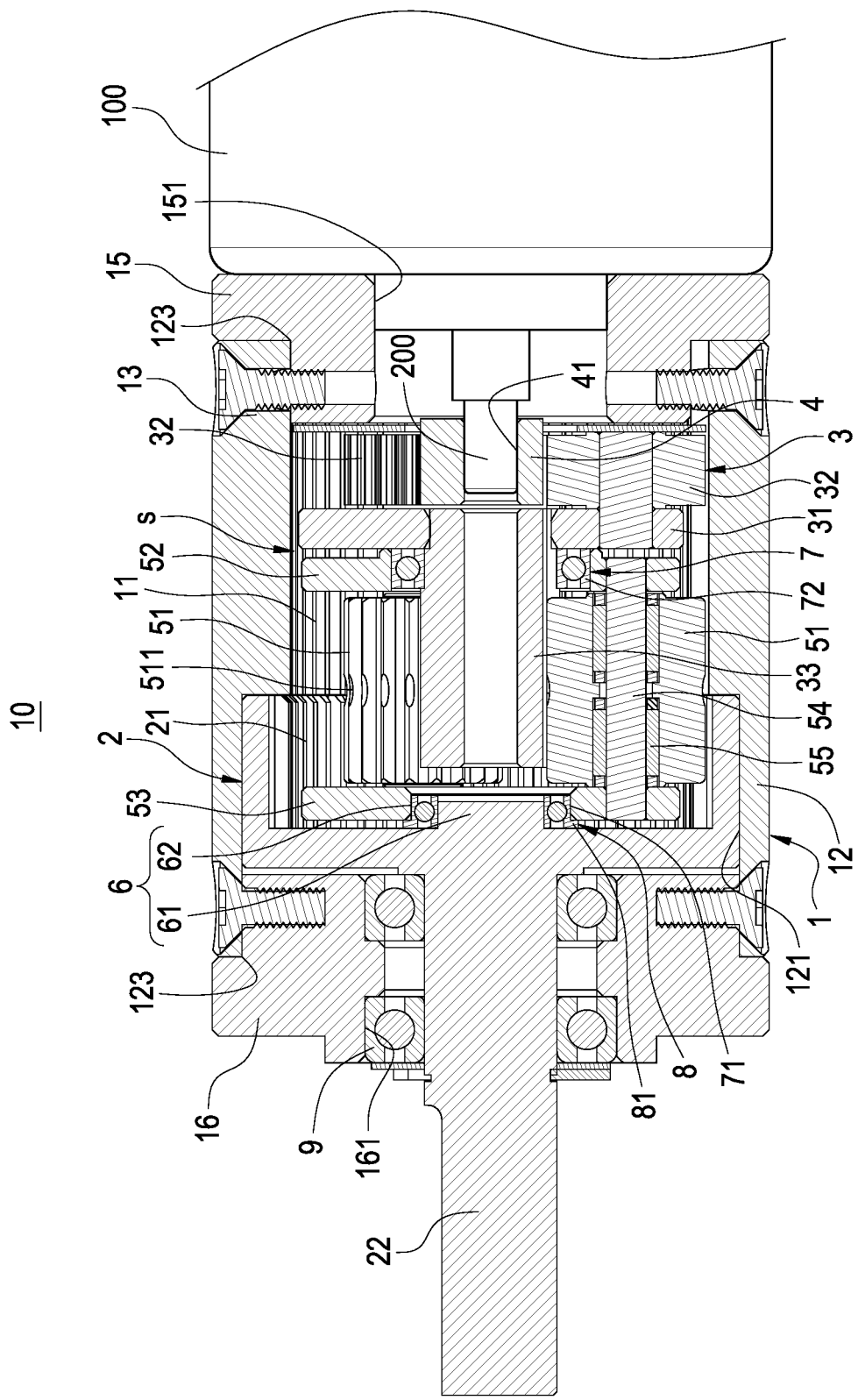
FIG. 7 is a cross-sectional view showing a status of using a low speed gear module of this disclosure.
Figure 8:
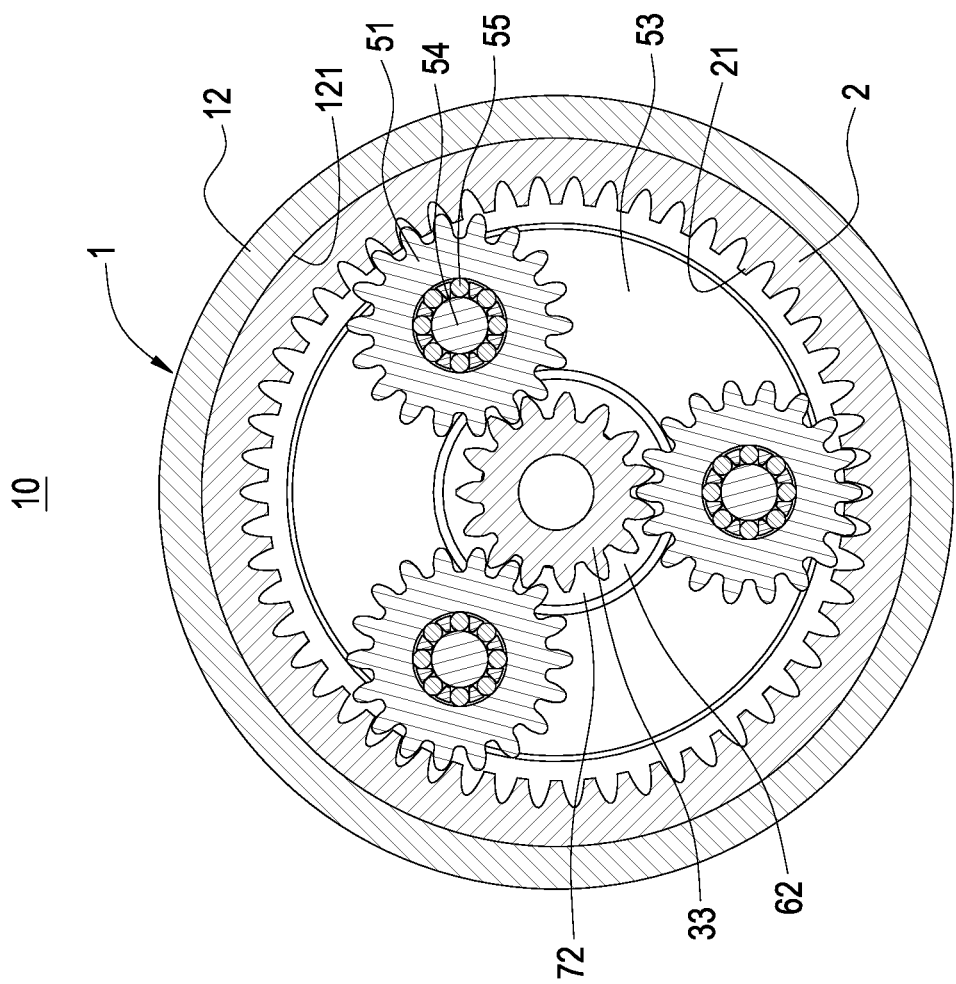
FIG. 8 is a partial cross-sectional view of a low speed gear module of this disclosure.
Figure 9:
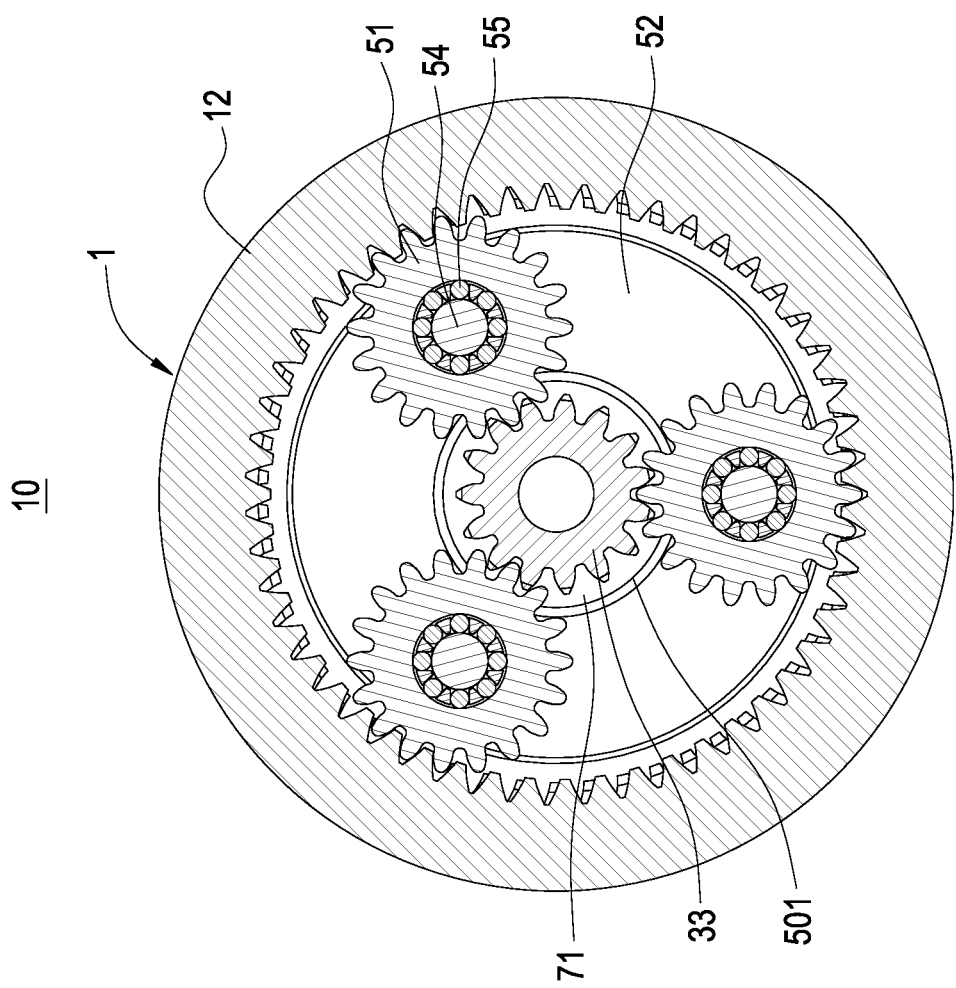
FIG. 9 is another partial cross-sectional view of a low speed gear module of this disclosure.
Figure 10:
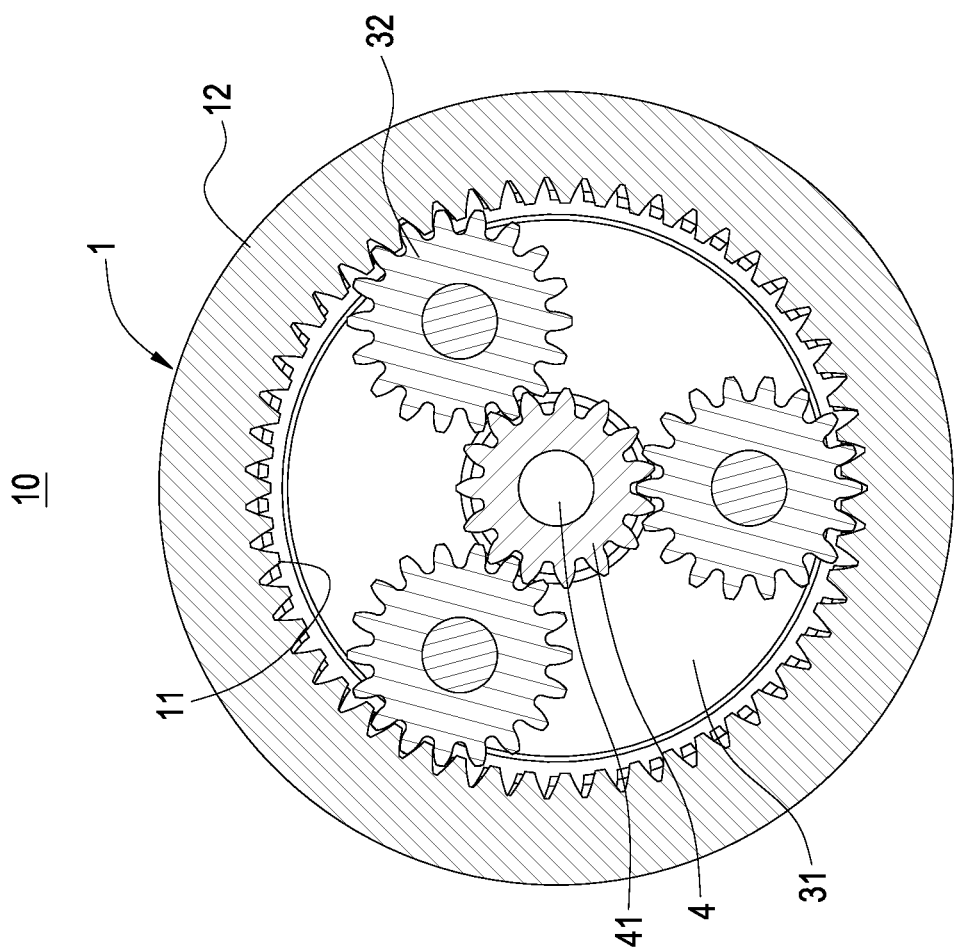
FIG. 10 is a further partial cross-sectional view of a low speed gear module of this disclosure.

In FIGS. 1, 5, and 7, the low speed gear module 10 of this disclosure further includes a gasket 8 with an outer diameter greater than the inner diameter of the concave hole 62 by 1 mm to 5 mm, the gasket 8 sheathes the convex column 61 and is clamped between the rotating cylinder 2 and the second clamping plate 53 of the positioning frame 50, and the gasket 8 of this embodiment is a ring block 81 disposed protrusively from the outer periphery of an end of the second ball bearing 72 away from the second planetary gear set 5, but this disclosure is not limited to such arrangement.

In FIGS. 1, 5 and 7, the low speed gear module 10 of this disclosure further includes one or more bearings 9, and the bearing 9 is clamped between an inner wall of the second hollow port 161 and the rotating shaft 22 for assisting the rotating shaft 22 to rotate relatively to an inner wall of the second hollow port 161 more smoothly.

With reference to FIGS. 3 to 9 for the schematic views showing the statuses of using a low speed gear module 10 of this disclosure, a drive shaft 200 of the motor 100 is inserted into the first hollow port 151 and fixedly connected to the sun gear 4 for driving the sun gear 4 to be engaged with the plurality of first planetary gears 32 again. Since the first inner gear 11 may not rotate, therefore when the first planetary gear 32 has a side engaged with the sun gear 4 and another side engaged with the first inner gear 11, the plurality of first planetary gears 32 is driven to rotate, but the plurality of first planetary gears 32 is fixedly connected to a side of the fixing plate 31 and the driven gear 33 is fixedly connected to another side of the fixing plate 31, so as to make the plurality of first planetary gears 32, the fixing plate 31 and the driven gear 33 to rotate altogether.

In addition, when the second planetary gear 51 has one side engaged with the driven gear 33 and another side engaged with the first inner gear 11, the driven gear 33 is rotatable, but the first inner gear 11 may not rotate, so that the plurality of second planetary gears 51 is driven to rotate.

Finally, when the second planetary gear 51 has one side engaged with the driven gear 33 and another side engaged with the second inner gear 21, the driven gear 33 is rotatable, and the second planetary gear 51 is also rotatable, so that the second inner gear 21 drives the rotating shaft 22 of the rotating cylinder 2 to rotate.

In this way, when the sun gear 4 and the drive shaft 200 do not rotate, the first planetary gear 32 may be jointly latched by the sun gear 4 and the first inner gear 11 and may not be engaged or rotated, and when the first planetary gear 32 is braked or stopped, the driven gear 33 is braked or stopped altogether, so that the second planetary gear 51 is also jointly latched by the driven gear 33 and the first inner gear 11 and may not be engaged or rotated, and the second inner gear 21 and the rotating cylinder 2 are also latched by the second planetary gear 51 and may not be engaged or rotated.

If the rotating shaft 22 of the rotating cylinder 2 needs to drive a heavy object up or down, although the gravity of the heavy object itself exert force to the second inner gear 21, the second inner gear 21 is held by the first planetary gear set 3 and the second planetary gear set 5 and may not be rotated, so that when the heavy object is lifted and the drive shaft 200 stops its operation, the second inner gear 2 may not be pulled by the gravity to rotate. As a result, the heavy object may not be pulled by gravity to move down to achieve the effects of braking or stopping the low speed gear module 10 effectively and achieving high torque.

In addition, the second inner gear 21 is held by the first planetary gear set 3 and the second planetary gear set 5, and the circumference of the second inner gear 21 is greater than the circumference of the sun gear 4, thus achieving that the effects of decreasing the rotation speed and increasing the deceleration ratio of the low speed gear module 10.

Further, the first ball bearing 71 is mounted between the driven gear 33 and the through hole 501 to decrease the gap between the driven gear 33 and the through hole 501, so as to reduce the offset space of the driven gear 33, and reduce the shaking of the driven gear 33 to be stably engaged with the plurality of second planetary gears 51. The second ball bearing 72 is mounted between the convex column 61 and the concave hole 62 to decrease the gap between the convex column 61 and the concave hole 62, so as to reduce the offset space of the plurality of second planetary gears 51 and reduce the shaking of the plurality of second planetary gears 51 to be stably engaged with the second inner gear 21. Therefore, the torque of the low speed gear module 10 is greatly improved.

In addition, the gasket 8 sheathes the convex column 61 and is clamped between the rotating cylinder 2 and the positioning frame 50, and the rotating cylinder 2 and the positioning frame 50 are separated by the gasket 8 to form a gap, so as to prevent the rotating cylinder 2 from rubbing with the positioning frame 50 during its rotation or reducing the smoothness of the rotation of the rotating cylinder 2.

Figure 11:
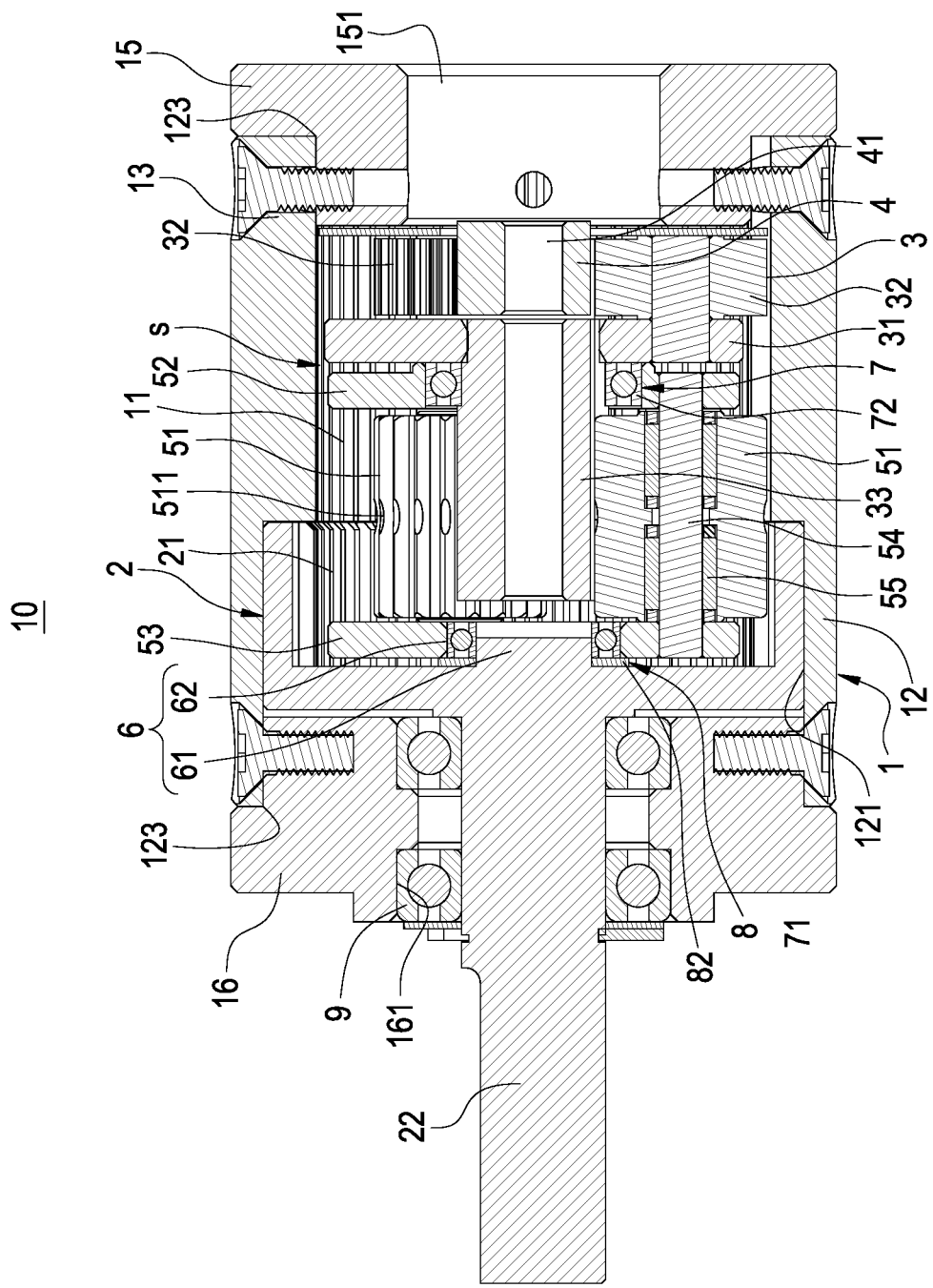
FIG. 11 is a cross-sectional view of a low speed gear module in accordance with another embodiment of this disclosure.

With reference to FIG. 11 for a low speed gear module 10 in accordance with another embodiment of this disclosure, this embodiment is substantially the same as the embodiment as shown in FIGS. 1 to 10, except that the gasket 8 and the second ball bearing 72 of this embodiment are two separate components, and the gasket 8 is a spacer 82 made of rubber, silicone, or other similar materials to achieve the same functions and effects of the embodiment as shown in FIGS. 1 to 10.

Figure 12:
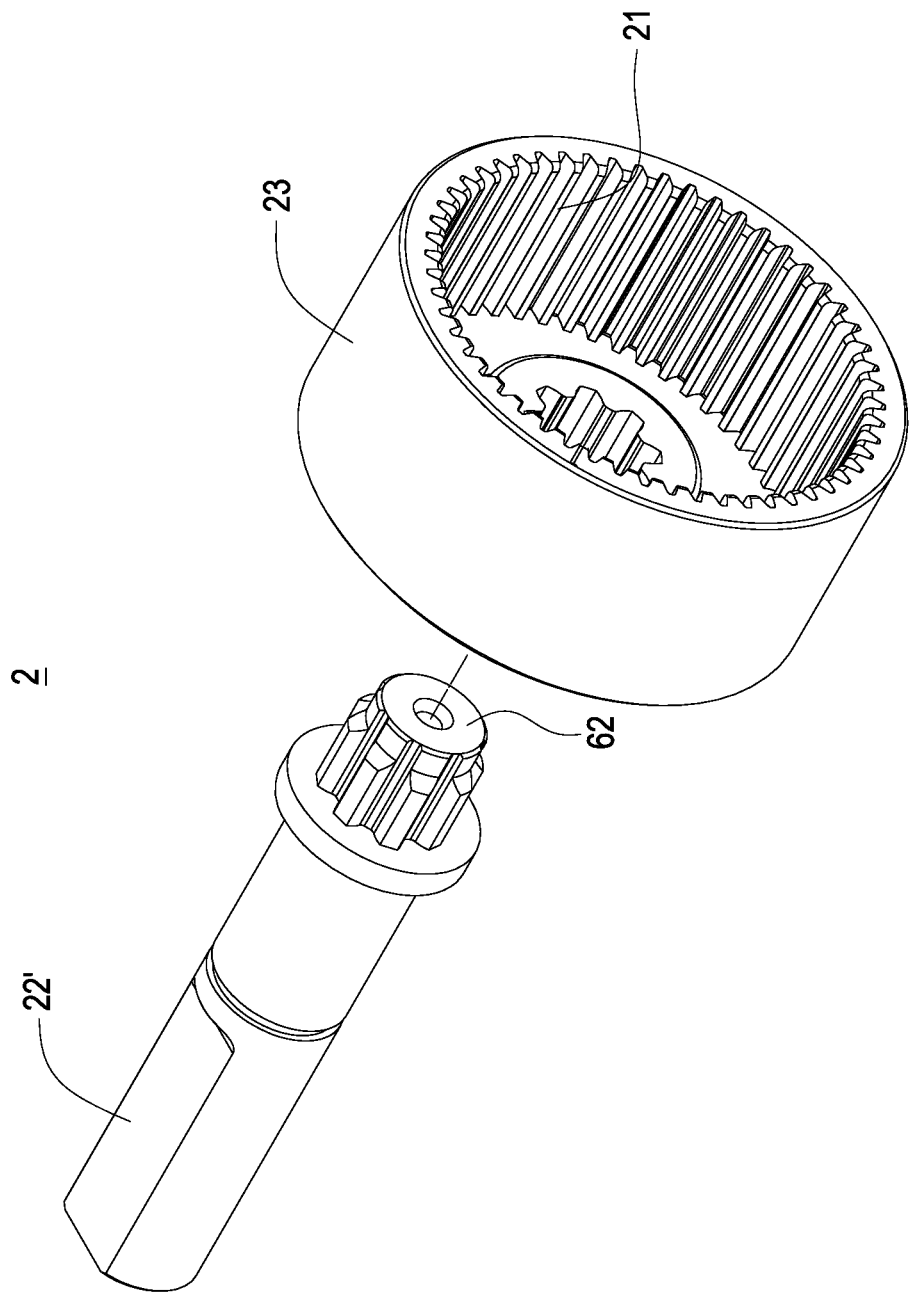
FIG. 12 is an exploded view of a rotating cylinder in accordance with another embodiment of this disclosure.
Figure 13:
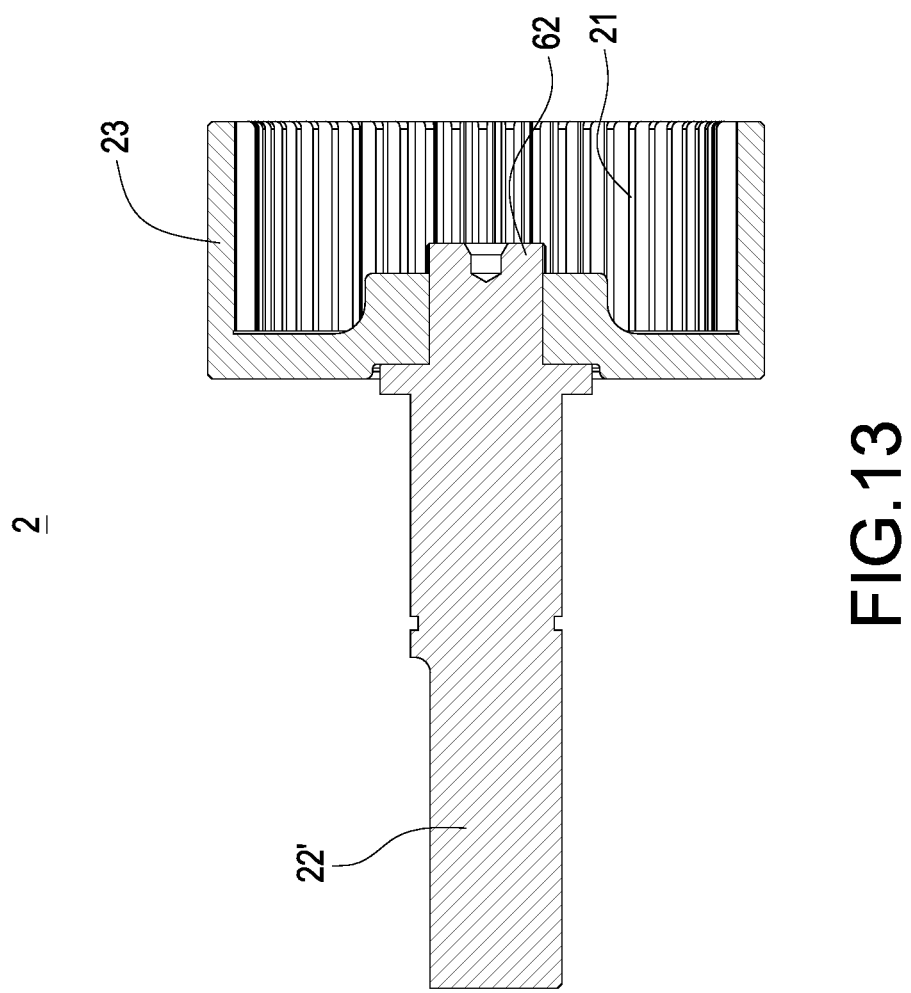
FIG. 13 is a cross-sectional view of a rotating cylinder in accordance with another embodiment of this disclosure.

With reference to FIGS. 12 and 13 for a rotating cylinder 2 in accordance with another embodiment of this disclosure, this embodiment is substantially the same as the embodiment as shown in FIGS. 1 to 10, except the structure of the rotating cylinder 2.

Further, the rotating cylinder 2 includes a main cylinder body 23, a rotating shaft 22' fixedly connected to the main cylinder body 23 and exposed from the outer side of the main cylinder body 23, a convex column 61 formed at a bottom end of the rotating shaft 22' and exposed from an inner side of the main cylinder body 23, and a second inner gear 21 formed at an inner periphery of the main cylinder body 23 to achieve the same functions and effects of the embodiment as shown in FIGS. 1 to 10.

What is claimed is:

1. A low speed gear module, comprising:
    a fixed cylinder part, comprising a first inner gear;
    a rotating cylinder, arranged corresponding to the fixed cylinder part, rotatable relative to the fixed cylinder part, comprising a second inner gear, and an accommodating space jointly defined between the first inner gear and the second inner gear;
    a first planetary gear set, accommodated in the accommodating space, and comprising a fixing plate, a plurality of first planetary gears fixedly coupled to a side of the fixing plate, and a driven gear fixedly coupled to another side of the fixing plate;
    a sun gear, installed between the first planetary gears, each first planetary gear engaged with the sun gear at one side thereof and engaged with the first inner gear at another side thereof to drive the driven gear to rotate with the first planetary gears;
    a second planetary gear set, installed on a periphery of the driven gear, comprising a positioning frame and a plurality of second planetary gears pivotally coupled to the positioning frame, each second planetary gear engaged with the driven gear at one side thereof and engaged with the first inner gear and the second inner gear at another side thereof to drive the rotating cylinder to rotate with the driven gear, and the positioning frame comprising a through hole defined on one side thereof for the driven gear to be inserted;
    a concave-convex structure, comprising a convex column extended from the rotating cylinder or another side of the positioning frame and a concave hole defined on another one of the rotating cylinders and another side of the positioning frame, and the convex column inserted in the concave hole; and
    a limit bearing set, comprising a first ball bearing adapted to sheathe the driven gear and mounted between the driven gear and inner surface of the through hole, and a second ball bearing adapted to sheathe the convex column and mounted between the convex column and inner surface of the concave hole.

2. The low speed gear module according to claim 1, further comprising a gasket, an outer diameter of the gasket greater than an inner diameter of the concave hole by 1 mm to 5 mm, and the gasket adapted to sheathe the convex column and clamped between the rotating cylinder and the positioning frame.

3. The low speed gear module according to claim 2, wherein the gasket is a ring block disposed protrusively from an outer periphery of an end of the second ball bearing away from the second planetary gear set.

4. The low speed gear module according to claim 2, wherein the gasket is a spacer.

5. The low speed gear module according to claim 2, wherein the positioning frame comprises a first clamping plate and a second clamping plate, the second planetary gears are equidistantly arranged in a circular shape and clamped and pivotally coupled between the first clamping plate and the second clamping plate, the through hole is defined on the first clamping plate, the first ball bearing is mounted between the driven gear and the first clamping plate, the convex column is extended from the rotating cylinder, the concave hole is defined on the second clamping plate, the second ball bearing is mounted between the convex column and the second clamping plate, and the gasket is clamped between the rotating cylinder and the second clamping plate.

6. The low speed gear module according to claim 5, wherein the positioning frame further comprises a plurality of pivot rods, two ends of each pivot rod are fixedly coupled between the first clamping plate and the second clamping plate, each second planetary gear is pivotally coupled to each pivot rod, the second planetary gear set further comprises a plurality of needle roller bearings, and each needle roller bearing is adapted to sheathe each pivot rod and disposed between each pivot rod and each second planetary gear.

7. The low speed gear module according to claim 1, wherein each of the second planetary gears comprises a circular notch defined along an outer periphery thereof and located between the first inner gear and the second inner gear.

8. The low speed gear module according to claim 1, wherein the convex column is extended from an inner side of the rotating cylinder, a rotating shaft is extended from an outer side of the rotating cylinder, the convex column is installed on a bottom end of the rotating shaft, and the second inner gear is disposed on an inner periphery of the rotating cylinder.

9. The low speed gear module according to claim 1, wherein the rotating cylinder comprises a main cylinder body, and a rotating shaft fixedly coupled to the main cylinder body and exposed from an outer side of the main cylinder body, the convex column is disposed on a bottom end of the rotating shaft and exposed from an inner side of the main cylinder body, and the second inner gear is disposed on an inner periphery of the main cylinder body.

10. The low speed gear module according to claim 1, wherein the fixed cylinder part comprises an outer cylinder body, a first cover plate and a second cover plate, the first inner gear is disposed on an inner periphery of a side of the outer cylinder body, a ring groove is defined on an inner periphery of another side of the outer cylinder body, the rotating cylinder is rotatably embedded in the ring groove, two openings are defined on two ends of the outer cylinder body, the first cover plate and the second cover plate cover the two openings respectively, the first cover plate comprises a first hollow port, the sun gear comprises a plug hole, and the first hollow port and the plug hole are arranged opposite to each other.

* * * * *